United States Patent [19]

Yamamoto

[11] 4,042,967
[45] Aug. 16, 1977

[54] GROUND FAULT SENSOR

[76] Inventor: Yujiro Yamamoto, 1880 Park Newport, Newport Beach, Calif. 92660

[21] Appl. No.: 625,922

[22] Filed: Oct. 28, 1975

[51] Int. Cl.² ............................................. H02H 3/16
[52] U.S. Cl. ....................................... 361/45; 361/72
[58] Field of Search ................. 317/18 D, 22, 36 TD, 317/143, 144; 310/8.1, 8.5, 8.6

[56] References Cited

U.S. PATENT DOCUMENTS

| 2,120,985 | 6/1938 | Melhose | 317/143 X |
|---|---|---|---|
| 2,201,879 | 5/1940 | Blattner et al. | 317/144 |
| 2,365,738 | 12/1944 | Williams | 317/144 |
| 3,739,229 | 6/1973 | Moran | 317/22 |

FOREIGN PATENT DOCUMENTS

| 592,468 | 9/1947 | United Kingdom | 317/18 D |
|---|---|---|---|
| 425,832 | 3/1935 | United Kingdom | 317/144 |

Primary Examiner—Harry E. Moose, Jr.
Attorney, Agent, or Firm—Grover A. Frater

[57] ABSTRACT

An improved ground fault tester uses a magnetostrictive element or piezo-electric element, such as a multimorph, which changes dimensions upon being magnetized or electrically charged. The dimensional change is used to interrupt the power circuit in which the ground fault occurs. The existence of a ground fault is sensed by a sensor which supplies current to the magnetostrictive or piezo-electric element. In the case of the piezo-electric element, the charge is dissipated through a parallel discharge circuit whereby interruption of the power circuit is accomplished rapidly and is reclosed only after a time delay. Automatic time delay resetting may be easily accomplished by the addition of a single resistor and a rectifier. The dimensional change in the piezo-electric or magnetostrictive element is utilized to reset the power circuit interrupter some selected number of times and/or at reduced power whereby ground faults can be distinguished from transient disturbances on the basis of their duration rather than by analysis of their electrical characteristics.

13 Claims, 5 Drawing Figures

GROUND FAULT SENSOR

BACKGROUND OF THE INVENTION

This invention relates to improvements in ground fault detection and protective systems.

The need for a complete circuit as a prerequisite to electrical current flow is satisfied by the provision of two conductive paths between a power source and its load. Many electrical power distribution systems, and almost all utility distribution systems, employ a pair of electrical conductors one of which is grounded to the earth. That is called the neutral line. The other conductor, the ungrounded one, is commonly called the "hot" line. A variety of fuses and circuit breakers and magnetic blowouts and thermally actuated switches are available for incorporation in such power lines to protect the line and the source from the current overload that results from short circuits and overloads. It is also common to include a third conductor in the system to serve as a ground wire. It is connected in parallel with the neutral line and is connected to the enclosures and frames and other metallic components of electrical appliances, motors, and other electric power utilization apparatus. In other systems, the neutral wire is connected to the metal case or frame and performs the dual function of serving as a ground wire and power conductor. Whatever the arrangement, the reason for connecting the frame or case of an electrical appliance to the power conductor is to ensure that the protective fuse will be blown or the protective circuit breaker will be opened, in the event that the hot line should become grounded to the frame or the case. If ungrounded exposed metal members of an appliance should come into contact with the hot line, the case or frame would become hot. It would present a shock hazard to one who might touch the exposed metal at the same time that he was connected to ground or earth.

While the practice of grounding the enclosure and major metal parts of electrical appliances has enhanced their safety, it has introduced another safety hazard. If the appliance user, or some other person or animal, should touch a hot line while simultaneously touching the grounded case or frame, he may experience an electrical shock. The fuse, or circuit breaker, that protects the line and power source will not protect a person who touches both the case and the hot line. They are operative to disrupt power only after the flow of an excessive current.

An unwanted circuit between the hot line and the grounded frame of an appliance, or between the hot line and ground, is called a "ground fault." Apparatus which can detect ground faults and supply a signal for use in interrupting electrical power to the fault is called a "ground fault sensor." Apparatus which can both detect the fault and accomplish interruption of the circuit is also called a ground fault sensor, or ground fault sensor system.

One of the requirements of a ground fault sensor is that it functions rapidly so that a person or animal through which the fault circuit extends will not suffer a serious electrical shock. The hazard is a function of current magnitude and time or the integral of current.

This description of the background of the invention has emphasized ground faults through people and animals that occur in electrical appliances because providing an improved apparatus and method for doing that is one of the primary objects of the invention. However, there is a need in other circumstances for interruption of electrical power prior to the flow of excessive current on the occasion of an unwanted or unplanned ground fault and the invention is useful in those other circumstances as well.

While many schemes and circuits and devices have been proposed in the literature, it appears that attempts to produce ground fault sensors have been limited to those circuits and schemes in which ground fault is sensed as the difference in current flow in the two power lines, or as a difference in potential in those two power lines relative to some third reference. This invention is particularly useful with that kind of sensor. However, in a broader sense, the invention is useful with any kind of sensor that can detect a ground fault and provide a signal which can be converted to, or can be represented by, a flow of electrical current.

It is an object of the invention to provide a ground fault tester detector that can employ any kind of fault sensor whose output signal is, or can be converted to, an electrical current.

Many communities throughout the United States have adopted electrical codes that require the installation of ground fault sensors in the lines that supply power to swimming pools and electrical appliances of the kind that have proven to offer a high risk of electrical shock. Proposals to require greater use of ground fault sensors have been critisized because of the high cost of the sensors that are available. If cost and size were reduced sufficiently, ground fault sensors might be required at every industrial and commercial electrical outlet, and even in every residential electrical outlet. It is an object of this invention to provide a ground fault sensor which can be produced at low cost and in such small physical size that that objective can be realized.

A major obstacle to the development of low cost, miniaturized ground fault sensors has been inability of the sensor to distinguish between ground faults against which protection is required and electrical transients against which no protection is required. Much of the effort in ground fault sensor development has been devoted to an attempt to distinguish between a differential current in the power lines that is occasioned by a ground fault from a transient differential. It is not satisfactory to have the ground fault sensor shut down the supply of power to a food freezer or to a life saving apparatus in a hospital, and in many other instances when no fault is involved. Accordingly, ability to distinguish faults from mere transients is an essential requirement in a practical ground fault sensor.

SUMMARY OF THE INVENTION

No attempt need be made in the invention to distinguish between transients and ground faults on the basis of their electrical character. They are distinguished, instead, on the basis of duration. Sensors are available which can detect a ground fault at such small differential flow and so rapidly that shock hazard is effectively eliminated. That being true, it is safe to re-establish power to the circuit, notwithstanding continued existence of the ground fault, if the apparatus suffers no loss of sensitivity and will operate to disconnect with the same rapidity at reconnection of power in the event that ground fault has persisted. In its preferred form, Applicant's invention senses the ground fault or transient and immediately interrupts power to the load and then, after a time interval, it tests to determine if the condition sensed was a fault or transient by reconnecting to the power source. If the fault still exists, power is immediately discontinued, but if the fault has been cleared, full power to the load is re-established.

It is an object of the invention to provide that kind of operation. It is another object of the invention to provide an apparatus whose response to the existence of the ground fault is greater when testing to determine if the fault still persists than it was in response to the initial ground fault or transient. That object, and others, which will hereinafter appear, are reailized by the use of a switching element of the kind whose physical dimensions change when subjected to an electrically produced electric or magnetic field. Such an element is used together with a means for interrupting power to the line as an incident to that physical change. In preferred form, the switching element is a piezo-electric or a magnetostrictive element.

The preferred form of piezo-electric element is a multimorph consisting of one or more slabs of piezo-electric material disposed between conductive layers so that the piezo-electric material serves as the dielectric in an electrical capacitor. The capacitor is charged almost instantly as an incident to detection of an unbalanced electrical condition in a pair of power lines. The multimorph bends and its bending is made to operate a switch or circuit breaker in the line whereby power is interrupted. The charge across the piezo-electric element is dissipated at a selected rate and the multimorph is permitted to return toward its original shape. As an incident to that, the switch or circuit breaker is closed to reapply power to the line. The multimorph is discharged through a parallel resistor which is not included in its charging circuit. Consequently, if the fault persists, the multimorph will immediately be recharged and will bend to reopen the switch or breaker. The multimorph and the switch or circuit breaker are related so that the circuit is again interrupted this time prior to full discharge of the multimorph. Consequently, switch or circuit breaker actuation is accomplished more rapidly after reapplication of power to test for continuance of the fault than in response to original fault or transient detection.

Since the piezo-electric element can drive more than one switch, or move more than one relay or switch contact, it can be used to close switches in sequence to reset the line with reduced power while the line is tested for persistence of the fault. To provide that advantage is another of the objects of the invention.

One of the features of the invention is the provision of means for counting the number of times that the line switch or circuit breaker is reset and for discontinuing resetting if the fault is not cleared after some selected number of attempts to reset.

The piezo-electric detector has the advantage that it ingetrates the information and stores it within itself as current charge. It responds to the integral of that information rather than its peak value as do previous ground fault sensors. Thus, it responds to degree of hazard and not to transient spikes. While the magnetostrictive form of the invention exhibits that advantage in lesser degree, it has other advantages. Its degree of dimensional change is small but ample to operate such devices as solid state strain gauges.

BRIEF DESCRIPTION OF THE DRAWINGS

In FIG. 1, terminals 10 and 12 represent points on a pair of power distribution lines connected between a source, not shown, and a load represented by resistor 14. Point 10 is a point on the hot line 16 and point 12 is one of the points on the grounded, or neutral, line 18. A circuit breaker 20 is included in series in the hot line 16 between line point 10 and the load 14. The main contacts 20A of the circuit breaker 20 are normally closed so that power can be supplied from the source to the load 14. That circuit breaker is to be opened, as shown, in the event that there is a ground fault in the system. An auxilliary set of contacts 20B are normally open. When closed, as shown in FIG. 1, contacts 20B connect a current limiting resistor 23 across the main contacts 20A when switch 36 is closed.

A ground fault exists whenever there is a circuit path established from the hot line 16 to ground, whether or not through neutral line 18, in parallel with the normal load 14. In FIG. 1, there is a ground fault and it is represented by the load resistor 22 which extends from hot line 16 to ground. The skin resistance of human beings and animals is relatively high. If impedance 22 represents the resistance through the body of a human being or an animal or a bird, it can be expected to have a value of 10,000 or more ohms. In most cases, that will represent an increase in the load seen by the source which is too small to result in operation of any overload protective circuit breakers or fuses that might be included in the power line. However, the addition of the current path provided by the impedance 22 will result in a division of the current that flows in hot line 16 so that some of that current will return to the source through the neutral wire 18 and some of the current will return to the source through the ground circuit. As a consequence, the current in line 16 will have a magnitude different than the magnitude of the current in line 18. Whether because of that difference, or some other difference in the electrical state of the lines occasioned by the addition of the ground fault, the ground fault sensor means 24 is capable of detecting the fact that there is a ground fault. The ground fault sensor means 24, by itself or by the addition of a rectifier 26, is capable of supplying unidirectional current to a dimension changing element 28 whose changes of dimension are transmitted by a means 30 to an actuator 32 by which the circuit breaker 20 is actuated. The actuator may simply be a part of element 28 as illustrated in FIG. 4, or it may comprise a relay or the circuit breaker coil as shown in the other figures.

Figure 5:
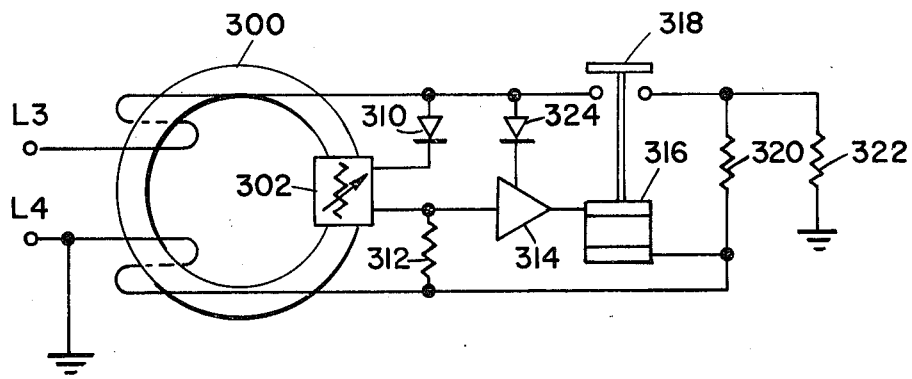
FIG. 5 is a diagram of a magnetostrictive form of the embodiment of FIG. 1.

The dimension changing element may be a magnetostrictive element as shown FIG. 5, or a piezo-electric element as shown in the other figures. When a magnetostrictive device is used, energy is applied to it by an energizing coil. On the other hand, when element 28 is a piezo-electric unit, it changes its dimensions in response to electrostatic stress to which it is subjected by reason of its disposition between charged capacitor plates. The system includes an impedance element, a resistor 34, through which that charge is dissipated at a rate determined by the time constant of the capacitor and the resistor.

The circuit breaker 20 and the actuator 32 and the dimensional change of the dimension changing element 28 are interrelated in a way that causes the circuit breaker to be open in response to a signal from the ground fault sensor means that there is a ground fault. That signal is a charging, or magnetizing, current to which the dimension changing element responds rapidly. The current is dissipated through the impedence element 34. It is not replenished because the circuit breaker 20 is located between the ground fault sensor and power source. When the charge in the dimension changing element is partly dissipated, the circuit breaker 20 is caused to close. Power is again applied to the load 14. If the ground fault, represented by load 22, persists, then the ground fault sensor means will replenish the charge on the dimension changing element and the circuit breaker will be opened immediately.

If switch 36 is closed, then a circuit is completed around the main contacts 20A of circuit breaker 20 when the main contacts open. That circuit includes a current limiting resistor 23 which is capable of limiting current to a safe value for those applicaitons in which the circuit is employed. Resistor 23 is also chosen so that it will pass sufficient current to enable the ground fault sensor to detect a significant fault. In a proper application, the inclusion of such a by-pass current leak will serve to prevent recycling while a significant fault continues.

A piezo-electric material is one which changes its physical dimension when placed in an electric field and which generates an electric potential in response to a change in its dimensions. Thus, a piezo-electric element is one in which mechanical deformation and electrical potential are interchangeable. The piezo-electric material is disposed between a pair of conductors such that the conductors serve as the plates of a capacitor for which the piezo-electric material is the dielectric. That combination of elements is called a piezo-electric element or a piezo-electric cell. A multimorph is a form of piezo-electric element which is specially arranged to maximize the degree of dimensional change for a given degree of electric stress. In the most common form, the multimorph consists of two thin, elongated slabs of piezo-electric material arranged back to back and fixed to a layer of conductive material between them. Another conductive layer is bonded to the opposite side of both piezo-electric slabs. The slabs are oriented so that one of them tends to become shorter and the other becomes longer when an electrical potential is applied between the center conductive layer and the two outside conductive layers. The degree of bending is a function of the length of the unit and of the electric potential across the piezo-electric slabs. The potential is determined by the charge on the conductive layers and the dielectric constant of the piezo-electric materials.

It is possible to construct such an element using only a single slab of piezo-electric material bonded to a strip of material that is flexible but which will not be elongated. That construction has been called a "unimorph." However, there is no established terminology for that construction and there is no established generic name for a construction in which elongation of one strip of piezo-electric material is opposed by another strip of material whereby bending occurs. In the absence of a recognized term, Applicant has adopted the term multimorph to be generic.

Once bent by the application of current to create a field across the piezo-electric element, the element remains bent until the current is discharged. In the invention, the multimorph is connected so that it cannot discharge through its source. That is accomplished in the embodiment illustrated by applying current to the multimorph through a bridge rectifier. The leakage resistance of modern piezo-electric materials in very high. Accordingly, the rate of discharge of the element can be effectively controlled over a very wide range of rates by the simple expedient of placing a resistor in parallel with the multimorph. By changing the value of that resistor, delay time from a few seconds to several days is readily achieved.

The ground fault sensor 24 may have a number of different forms. One preferred form involves a differential transformer. In practice, that transformer would be wound on a single core. For the sake of clarity and simplicity, the transformer is divided into two sections, each having its own core, in the circuit of FIG. 2. One of those transformers is designated 40 and the other is designated 42. Each of those transformers has a primary winding and a secondary winding. The primary winding 43 of transformer 40 is connected in hot line 44. The primary winding 45 of transformer 42 is connected in neutral line 46. The windings are connected in those lines intermediate a circuit breaker 48 and a load 50. The circuit breaker comprises two sections, one connected in hot line 44 and the other connected in neutral line 46. They are operated by a single electromagnetic actuator 52. Terminals 53 and 54 represent points in the hot line and neutral line, respectively, at the side of the circuit breaker toward the power source.

Returning to the ground fault sensor transformers 40 and 42, the secondary winding 55 of transformer 40 is connected in a series circuit with the resistance element of a potentiometer 56 and the second winding 57 of transformer 42. Currents induced in windings 55 and 57 buck one another so that the voltage across the resistance element of the potentiometer is zero when current in the primary winding 43 is exactly equal to the current in primary winding 45. If the current in those two windings is different, then the alternating voltages induced in secondary windings 55 and 57 are different and a potential will appear across the resistance element of the potentiometer. The voltage between the adjustable tap 58 of the potentiometer and the right side of the potentiometer at line 60 is applied to a bridge rectifier 62 whose output is a unidirectional potential appearing on lines 64 and 66. A discharge resister 68 is connected in series with a rectifier 69 between those lines in parallel with the conductive layers of a bimorph 70. The bimorph consists of two strips of piezo-electric material having a conductive layer 72 between them. The upper surface 74 of the upper piezo-electric strip 76 is connected to line 64 as is the conductive strip 78 at the lower side of the lower piezo-electric strip or bar 80. The element 70 has fixed mounting at one end by a means 82.

Upon the application of an electrical potential across lines 64 and 66, current flows to charge the capacitor formed by layer 72 and layer 74 in which the element 76 is the dielectric and to the capacitor formed by conductive layers 72 and 78 in which the dielectric is formed by piezo-electric strip 80. The two piezo-electric strips are oriented so that they will bend in the manner shown when the bimorph is energized and charged.

Bending of the bimorph 70 carries the moveable contact 88 away from fixed contact 90 and opens the circuit from hot line 44 that extends through a Zener diode 92 and the actuating coil 52 of the normally open circuit breaker 48 to the reset counter circuit. That reset counter circuit includes a flip-flop 96, an AND gate 98, and a counter 100. One input of the AND gate is connected directly to contact 88 of the bimorph and the input to the AND gate is connected to that contact through the flip-flop 96. The flip-flop can be set to provide a path from the contact 88 to the AND gate either by closure of the manual reset switch 102 or by operation of the counter 100. The counter is adjustable so that it supplies a signal by line 104 to the flip-flop, after counting a selected number of closures of contacts 88 and 90, which will cause the flip-flop to interrupt connection through it from contact 88 to the AND gate 98. By appropriately setting the counter 100, the circuit can be adjusted so that the circuit breaker 48 will reset one, two, three, four, or more times, or not at all.

Figure 1:
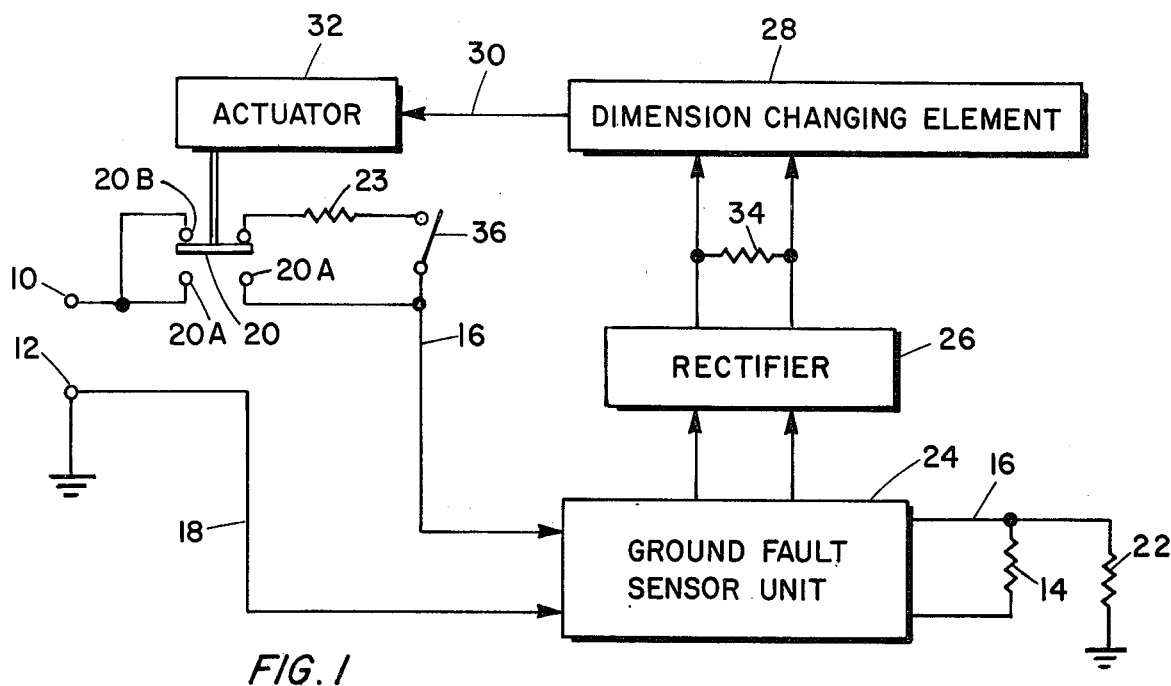
FIG. 1 is a diagram of a preferred embodiment of the invention shown partly in block form and partly in schematic form.
Figure 2:
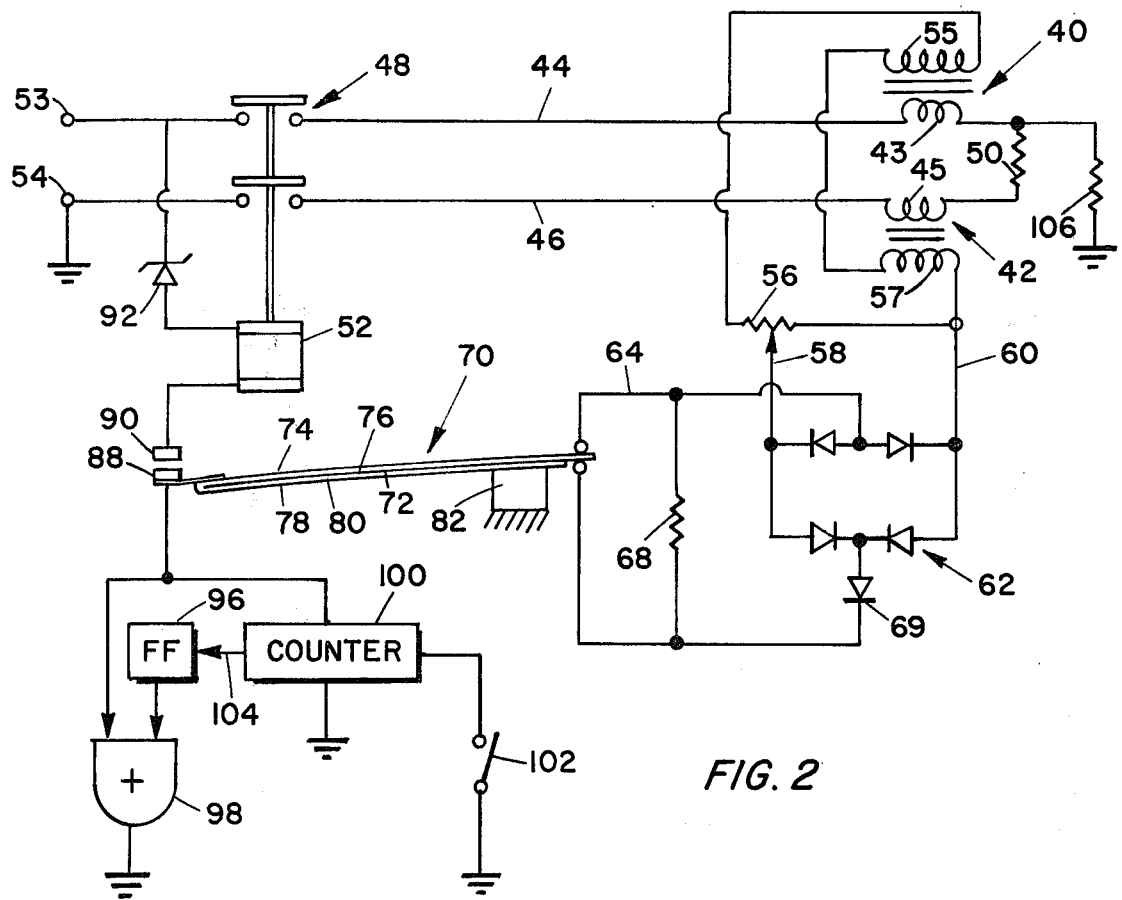
FIG. 2 is a diagram of a modified form of the embodiment of FIG. 1.

In FIG. 2, a ground fault is represented by the load resistor 106 which extends from hot line 44 to ground.

Figure 3:
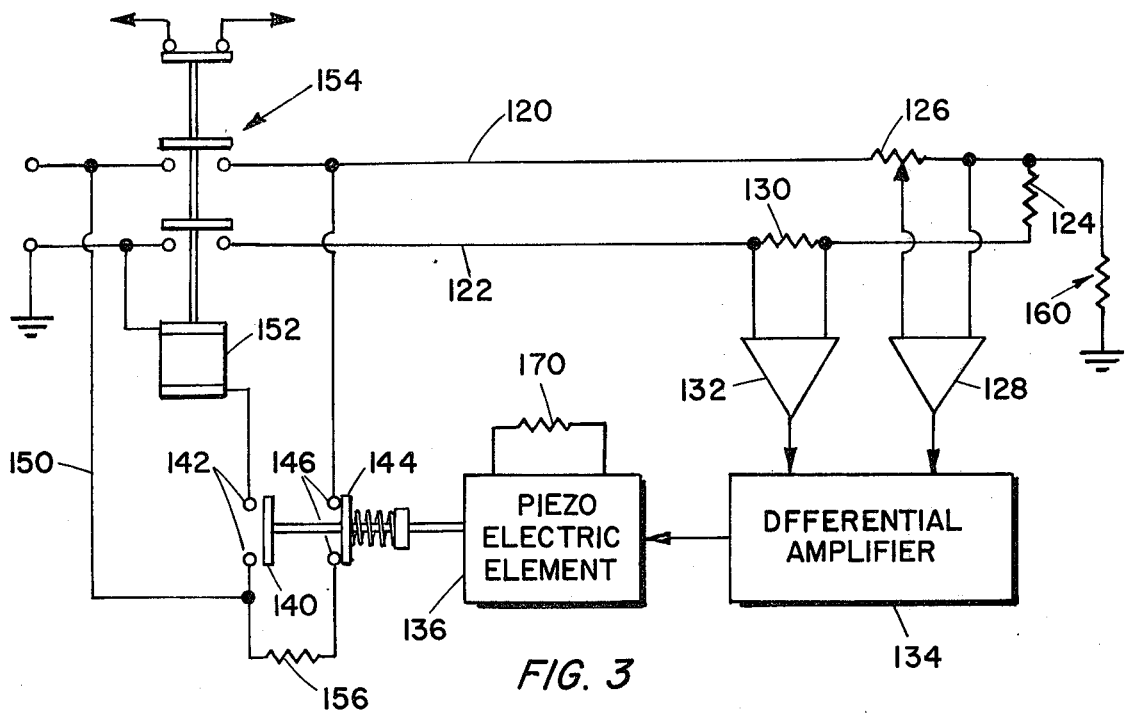
FIG. 3 is a diagram of another modified form of the embodiment of FIG. 1.

In FIG. 3, the hot line is identified by numeral 120, and the neutral line by numeral 122. The load 124 is connected between them. Hot line 120 includes the resistance of a potentiometer 126. TThe voltage across the resistor from the tap to one end is applied to an amplifier 128. The voltage across a resistor 130 in the neutral line 122 is applied to the input of an amplifier 132. The output of the two amplifiers are applied to a differential amplifier 134. The output of the differential amplifier is a unidirectional current the magnitude of which depends upon the difference of the voltage output to amplifiers 128 and 132. That differential current is applied to a piezo-electric element 136 which may be like the bimorph 70 of FIG. 2. However, in the case of FIG. 3, the piezo-electric element actuates two bridging contacts. One contact 140 bridges a pair of terminals 142. The other bridging contact 144 bridges contacts 146. Both of the bridging contacts 140 and 144 are resiliently mounted on the piezo-electric element 136. When the piezo-electric element is completely discharged and is straight rather than being bent, both of the bridging contacts 140 and 144 engage their respective fixed contacts sets 142 and 146. The resilient mounting of the two bridging contactors is different. When the piezo-electric element begins to charge, bridging contactor 140 is first to be disengaged from its fixed contacts 142. Only until the piezo-electric element bends in greater degree is the bridging contact 144 disengaged from its fixed contact set 146. When the piezo-electric element 136 is fully charged, both bridging contacts are separated from their respective fixed contact sets. When the piezo-electric element is discharged, first bridging contact 144 engages its fixed contact set 146, and then the bridging contact 140 bridges its fixed contact at 142.

When bridging contact 140 is closed, the circuit is completed from the hot line 120 through the line 150, contacts 142 and 140, and the actuating coil 152 of a circuit breaker 154 back to the neutral line 122. The circuit breaker includes a separate set of contacts in each of the lines at a point toward the load from the intersection of line 150 and hot line 120. When contacts 144 are closed, a circuit is completed from hot line 120 on one side of the circuit breaker contacts through line 150, and a current limiting resistor 156 through bridging contact 144 and line 158 back to the hot line 120 at the other side of the circuit breaker contact. Thus, a small amount of current can flow through the differential current sensing resistors 126 and 130 to the load 124 and to the ground fault represented by load 160 after contact 140 is opened to remove power from the circuit breaker if the bridging contact 144 has not been removed from its fixed contact set.

In operation of the circuit of FIG. 3, before the existance of a ground fault, the output of amplifiers 128 and 132 are equal so that no current is supplied by the differential amplifier 134 to the piezo-electric element 136. As a consequence, the piezo-electric element assumes its uncharged physical condition in which the bridging contacts 144 and 140 are made to bridge their respective contacts. In that circumstance, current is applied through bridging contact 140 to the actuating coil 152 of the circuit breaker, the contacts of which are closed. As soon as a fault developes, the current in resistor 126 is different from that of 130. Amplifiers 128 and 132 send different signals to the differential amplifier which applies a current to the piezo-electric element 136. That piezo-electric element immediately changes its physical dimensions withdrawing contactor 140 from contacts 142. If the fault represents a very light load, the differential current in resistors 126 and 130 may be so small, and the current applied to the piezo-electric element by the differential amplier 134 may be so small in amplitude, that it cannot overcome the effect of discharge of current through the parallel resistor 170. In that case, bridging contact 144 may not be removed from its fixed contacts 146 and the contacts may remain in the condition shown in FIG. 3, with the main circuit breaker open, until the ground fault is removed. On the other hand, if the ground fault represents a significant load, additional current will be supplied by the differential amplifier to the piezo-electric element and the element will bend enough to remove bridging contact 144 from its fixed contacts. When the piezo-electric element has discharged sufficiently through a discharge resistor 170, a piezo-electric element will unbend to re-engage the bridging contact 144 with the fixed contact 146 to permit a small current to flow through resistor 156 to the load and to the ground fault if it persists. If the ground fault still exists, there will be a differential current. The differential detection circuit will reapply current to the piezo-electric element 136 and the bridging contact 144 will again be retracted from fixed contacts 146. The circuit will continue to cycle until the fault is removed. When that happens, the differential amplifier will not supply bending current to the piezo-electric element. Eventually, the element will discharge sufficiently to close bridging contact 140 against its fixed contact 142. The circuit breaker will be re-energized and the breaker closed to apply full power to the load.

Figure 4:
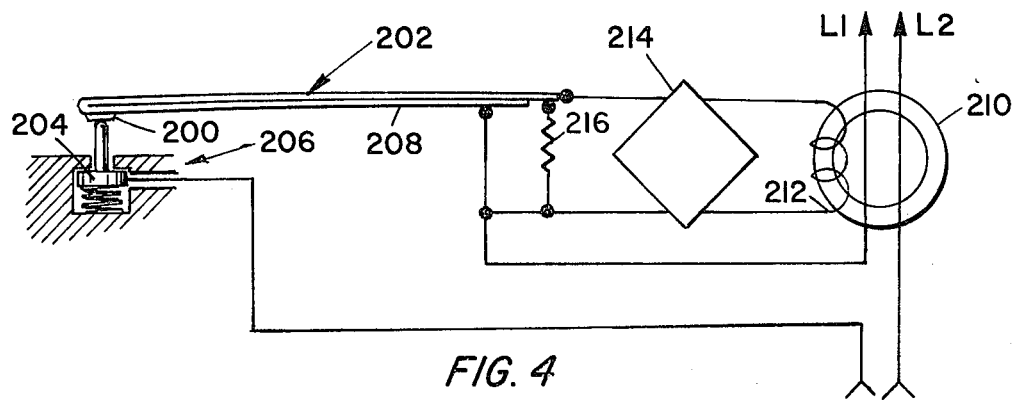
FIG. 4 is a diagram of still another modified form of the embodiment of FIG. 1.

FIG. 4 is a diagram of a very simple ground fault sensor in which the end of the dimension changing element operates the circuit breaker contacts directly. In fact, one of the contacts 200 is carried directly on the element 202 which, in this case, is a piezo-electric multimorph. Contact 200 normally engages a contact 204. Contact 204 is spring biased toward contact 200, but its movement is restricted by the structure 206 so it serves as the fixed contact of the set 200–204. Those contacts are normally closed and they are in series with A.C. power line L1 of the set L1, L2. Part of the path includes the conductive layer 208 of the bimorph.

The power lines pass through a toroidal core 210. Any imbalance in the current in those lines prevents cancellation of their magnetic effect and a magnetic flux is made to flow in the core. The flux in the core, if any, will alternate at power line frequency. A voltage will be induced in the secondary winding 212 and current will flow to rectifier 214. Converted to unidirectional current in the rectifier, that current will flow to charge the bimorph 202. The bimorph orientation and voltage polarity are such that the bimorph bends up, when charged, to separate contact 200 from contact 204. The bimorph discharges through resistor 216 to reset the contacts. If the imbalance of currents persists, the action will be repeated.

In FIG. 5, the element 300 is a C-shaped bar of nickle alloy magnetostrictive material. The ends of the bar are clamped firmly against the sides of a strain gauge unit 302 which exhibits a resistance that varies with pressure. A very small dimensional change in the separation of the ends of the C-shape results in an appreciable change in the resistance at the output terminals of the strain gauge. For this application, a p-n junction, semiconductor, strain gauge is preferred.

The strain gauge 302 is connected between alternating power lines L3 and L4 in series with a rectifier 310 and a voltage dividing, amplifier input resistor 312. The junction between the strain gauge and resistor 312 is connected to the input of amplifier 314 which serves as a switch for applying power to the coil 316 of a circuit breaker having a contact 318 in series with line L3 ahead of load 320 and any ground fault such as the fault represented by resistor 322.

Lines L3 and L4 are wound around the magnetostrictive core 300 such that their magnetic effect is cancelled if line currents are equal. If they are not, a flux is induced in core 300 which is made to change its length at the power line frequency. The change is minute but it is detected in the strain gauge as a modulation of resistance. That produces a minute voltage change at the input of amplifier switch unit 314. in response to the alternating input signal, unit 314 turns on in the sense that power is permitted to flow through rectifier 324 and circuit breaker solenoid 316 from line L3 to L4. Thus energized, the circuit breaker opens its contacts 318.

Although I have shown and described certain specific embodiments of my invention, I am fully aware that many modifications thereof are possible. My invention, therefore, is not to be restricted except insofar as is necessitated by the prior art.

I claim:

1. A ground fault detector for connection in a pair of electrical power lines and comprising:
    a switch connected in series in one of said lines;
    actuating means in the form of a piezo-electric element of the kind that changes dimensions when subjected to an electric field for actuating said switch;
    electrically chargeable means chargeable to create an electric field in said piezo-electric element sufficient for rendering said actuating means operable to actuate said switch; and
    charging means responsive to differences between the electrical state of the lines of said pair of lines for charging said electrically chargeable means.

2. The invention defined in claim 1 in which said charging means comprises means for converting alternating electrical differentials in the state of said lines to unidirectional element current and in which said piezo-electric element is a multimorph.

3. A ground fault detector for connection in a pair of electrical power lines and comprising:
    a switch connected in series in one of said lines;
    actuating means in the form of a piezo-electric element of the kind that changes dimensions when subjected to an electric field for actuating said switch;
    electrically chargeable means chargeable to create an electric field in said piezo-electric element sufficient for rendering said actuating means operable to actuate said switch;
    charging means responsive to differences between the electrical state of the lines of said pair of lines for charging said electrically chargeable means; and
    means for discharging said electrically chargeable means at a selected discharge rate.

4. The invention defined in claim 3 in which said actuating means comprises the piezo-electric elements of a multimorph and said electrically chargeable means comprises the conductive layers of said multimorph.

5. The invention defined in claim 4 in which said actuating means further comprises means for utilizing power taken from said lines to actuate said switch.

6. The invention defined in claim 4 in which said charging means comprises means for detecting differentials in the magnitude of current flowing in said lines.

7. The invention defined in claim 4 in which said charging means comprises means for detecting differentials in the voltage on said lines relative to another reference.

8. A ground fault detector for connection in a pair of electrical power lines and comprising:
    a switch connected in series in one of said lines;
    actuating means in the form of a piezo-electric element of the kind that changes dimensions when subjected to an electric field for actuating said switch;
    electrically chargeable means chargeable to create an electric field in said piezo-electric element sufficient for rendering said actuating means operable to actuate said switch;
    charging means responsive to differences between the electrical state of the lines of said pair of lines for charging said electrically chargeable means;
    said charging means comprising means for converting alternating electrical differentials in the state of said lines to unidirectional electrical current and in which said piezo-electric element is a multimorph; and
    a time delay discharge resistor connected in parallel with said multimorph.

9. A ground fault detector for connection in power conductors extending from a source of electrical power at least one of which conductors includes a switch connected in series therewith, comprising:
    a multimorph responsive to currents applied thereto as an incident to imbalance in said conductors to charge its physical dimensions; and
    means responsive to such change in physical dimensions for actuating said switch.

10. A ground fault detector for connection in power conductors extending from a source of electrical power at one of which conductors includes a switch connected in series therewith, comprising:
    a multimorph responsive to currents applied thereto as an incident to imbalance in said conductors to charge its physical dimensions;
    means responsive to such change in physical dimensions for actuating said switch; and means for discharging said multimporph at a selected rate whereby said switch is reactuated following a time interval.

11. The invention defined in claim 10 which further comprises means responsive to unbalance in said conductors when said multimorph has been discharged in a given degree for recharging said multimorph whereby said switch is not reactivated while said imbalance persists.

12. The method of protecting persons who come in contact with the hot side of a pair of electrical power conductors and ground which comprises the steps of:
   a. measuring and comparing the electrical state of the conductors of said pair;
   b. altering the electrical charge of a multimorph upon finding a differential in the electrical state of said conductors;
   c. opening said hot side when the charge on said multimorph exceeds a selected magnitude;
   d. discharging said multimorph at a selected rate such that its charge falls below said selected magnitude and reclosing said hot side; and
   e. reopening said hot side if, at the time of reclosing, there is a differential in the electrical state of said conductors.

13. A ground fault detector for connection in a pair of electrical power lines and comprising:
   interruption means for interrupting said power lines;
   actuating means of a kind that changes dimensions when subjected to an electrically created field for actuating said interrupting means;
   field creating means for creating a field electrically to render said actuating means operable to actuate said interruption means;
   means responsive to differences between the electrical state of said power lines for rendering said field creating means effective to create a field;
   means for dissipating said electrically created field;
   said actuating means being effective to reactivate said interrupting means to terminate interruption of said power lines upon dissipation of said field; and
   means for dissipating said electrically created field sufficiently to reactuate said actuating means after a selected time delay.

* * * * *